(12) United States Patent
Okawachi

(10) Patent No.: US 10,493,843 B2
(45) Date of Patent: Dec. 3, 2019

(54) VEHICLE

(71) Applicant: TOYOTA JIDOSHA KABUSHIKI KAISHA, Toyota-shi, Aichi-ken (JP)

(72) Inventor: Eiji Okawachi, Toyota (JP)

(73) Assignee: Toyota Jidosha Kabushiki Kaisha, Toyota-shi, Aichi-ken, (JP)

( * ) Notice: Subject to any disclaimer, the term of this patent is extended or adjusted under 35 U.S.C. 154(b) by 85 days.

(21) Appl. No.: 15/820,670

(22) Filed: Nov. 22, 2017

(65) Prior Publication Data

US 2018/0147935 A1 May 31, 2018

(30) Foreign Application Priority Data

Nov. 28, 2016 (JP) ................................. 2016-229981

(51) Int. Cl.
*B60K 15/07* (2006.01)
*B60K 15/03* (2006.01)
(Continued)

(52) U.S. Cl.
CPC ........ *B60K 15/07* (2013.01); *B60K 15/03006* (2013.01); *B60K 2001/0416* (2013.01); *B60K 2015/03013* (2013.01); *B60K 2015/0319* (2013.01); *B60K 2015/03026* (2013.01); *B60K 2015/03118* (2013.01); *B60K 2015/03375* (2013.01); *B60K 2015/03381* (2013.01); *B60K 2015/03585* (2013.01); *B60K 2015/0638* (2013.01); *B60Y 2200/10* (2013.01); *F17C 2201/0109* (2013.01);
(Continued)

(58) Field of Classification Search
CPC .... B60K 15/03006; B60K 2015/03118; B60K 2015/03296; B60K 2015/03381; B60K 15/07
See application file for complete search history.

(56) References Cited

U.S. PATENT DOCUMENTS 6,974,156 B2 * 12/2005 Kosuge ............ B60K 15/03006
280/831
7,270,209 B2 * 9/2007 Suess ............... B60K 15/03006
180/69.5
(Continued)

FOREIGN PATENT DOCUMENTS

JP     2002-046484 A    2/2002
JP     2006-188169      7/2006
(Continued)

*Primary Examiner* — Kevin F Murphy
(74) *Attorney, Agent, or Firm* — Finnegan, Henderson, Farabow, Garrett & Dunner, LLP

(57) ABSTRACT

A vehicle includes a plurality of tanks storing gas in the tanks and arranged in a longitudinal direction of the vehicle, and each of the tanks includes: a pressure relief device configured to open when a temperature of the tank becomes a predetermined temperature or more; and a release part releasing the gas in the tank in a predetermined direction by the opening of the pressure relief device, wherein the release direction of the gas released from the release part of the front tank located at a frontward position among the plurality of tanks is defined to be a direction directly facing a space between the pressure relief devices of the rear tanks disposed more rearward than the front tank, and a ground.

8 Claims, 6 Drawing Sheets

(51) Int. Cl.
  *B60K 1/04* (2019.01)
  *B60K 15/063* (2006.01)
  *B60K 15/035* (2006.01)

(52) U.S. Cl.
  CPC .............. *F17C 2205/0317* (2013.01); *F17C 2205/0394* (2013.01); *F17C 2260/021* (2013.01)

(56) References Cited

U.S. PATENT DOCUMENTS

| | | |
|---|---|---|
| 2008/0156809 A1 | 7/2008 | Mizuno et al. |
| 2010/0276024 A1 | 11/2010 | Iida et al. |
| 2011/0139534 A1* | 6/2011 | Klimek .................. B60K 1/04 180/309 |
| 2014/0097260 A1* | 4/2014 | Veenstra .............. B60K 15/063 236/92 C |

FOREIGN PATENT DOCUMENTS

| | | |
|---|---|---|
| JP | 2009-162255 | 7/2009 |
| WO | WO2009/084706 A1 | 7/2009 |

\* cited by examiner

VEHICLE

INCORPORATION BY REFERENCE

The disclosure of Japanese Patent Application No. 2016-229981 filed on Nov. 28, 2016 including the specification, drawings and abstract is incorporated herein by reference in its entirety.

BACKGROUND

1. Technical Field

The present disclosure relates to a vehicle.

2. Description of Related Art

In Japanese Unexamined Patent Application Publication No. 2009-162255 (JP 2009-162255 A2), there is disclosed a vehicle including a plurality of tanks storing gas therein. These tanks have pressure relief devices, each configured to open when a temperature of the tank becomes a predetermined temperature or more. Each of the pressure relief devices has a gas release direction adjusted so as to release the gas in the tank in an obliquely rearward and downward direction of the vehicle.

SUMMARY

In the case in which there is a heat source at a vehicle-frontward position, even if the pressure relief device of the front tank is operated, the rear tanks are located farther from the heat source, and thus a delay in operations of the pressure relief devices of the rear tanks might be caused. Hence, it has been desired to provide a technique capable of rapidly operating pressure relief devices of rear tanks.

The present disclosure can be implemented as the following aspects.

According to one aspect of the present disclosure, there is provided a vehicle. This vehicle includes a plurality of tanks storing gas in the tanks and arranged in the longitudinal direction of the vehicle, the tanks including a front tank located at a frontward position among the plurality of tanks and a rear tank located at a more rearward position than the front tank; wherein each of the tanks includes a pressure relief device configured to open when a temperature of the tank becomes a predetermined temperature or more and a release part releasing the gas in the tank in a predetermined direction by the opening of the pressure relief device; and a release direction of the gas released from the release part of the front tank is defined to be a direction directly facing a space between the pressure relief device of the rear tank and a ground. According to the vehicle of this aspect, the release direction of the gas released from the release part of the front tank is located between the pressure relief device of the rear tank and the ground; therefore, if a heat source is located at a vehicle-frontward position, it is possible to heat the pressure relief device of the rear tank by the gas released from the release part of the front tank. Accordingly, it is possible to rapidly operate the pressure relief device of the rear tank.

In the vehicle of the above aspect, the front tank may be arranged such that a longer-length direction thereof extends along the longitudinal direction of the vehicle; the release part of the front tank is disposed at a rear end of the front tank; and the rear tank is arranged such that a longer-length direction thereof extends along the lateral direction of the vehicle. According to the vehicle of this aspect, since the longer-length direction of the front tank extends along the longitudinal direction of the vehicle, and the release part is provided at the rear end of the front tank, in the case in which the heat source is located at a vehicle-frontward position, it is possible to rapidly operate the pressure relief device of the rear tank.

In the vehicle of the above aspect, a plurality of rear tanks may be provided; and the release direction of the gas released from the release part of the front tank may be defined to be a direction directly facing a space between the pressure relief devices of all the rear tanks and the ground. According to the vehicle of this aspect, in the case in which the heat source is located at a vehicle-frontward position, it is possible to efficiently supply the heat to the pressure relief devices of all the rear tanks by the gas released from the release part of the front tank. Hence, it is possible to rapidly operate the pressure relief devices of the rear tanks.

In the vehicle of the above aspect, the space may be a space located obliquely rearward and downward of the front tank, and the space may be a space except for a space where the rear tanks and rear wheels included in the vehicle are disposed.

In the vehicle of the above aspect, the release directions of the gas of the rear tanks may be defined to face a rearward and downward direction of the vehicle.

In the vehicle of the above aspect, the rear tanks may include a first rear tank and a second rear tank, the second rear tank may be disposed at a more rearward position of the vehicle than the first rear tank, and the first rear tank may be disposed more downward than the second rear tank in a vertical direction.

In the vehicle of the above aspect, the release direction of the gas released from the release part of the front tank may be defined within a range from a vertically downward direction of the front tank to a tangential line relative to an outer diameter of the first rear tank.

In the vehicle of the above aspect, the rear tanks may include a first rear tank and a second rear tank, the second rear tank may be disposed at a more rearward position of the vehicle than the first rear tank, and the second rear tank may be disposed more downward than the first rear tank in the vertical direction.

In the vehicle of the above aspect, the release direction of the gas released from the release part of the front tank may be defined within a range from a vertically downward direction of the front tank to a tangential line relative to an outer diameter of the second rear tank.

In the vehicle of the above aspect, the vehicle may be a fuel cell vehicle, and a hydrogen gas as a fuel gas may be stored in the tanks.

The present disclosure can be implemented by various embodiments, and for example, can be implemented as an embodiment of a manufacturing method of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
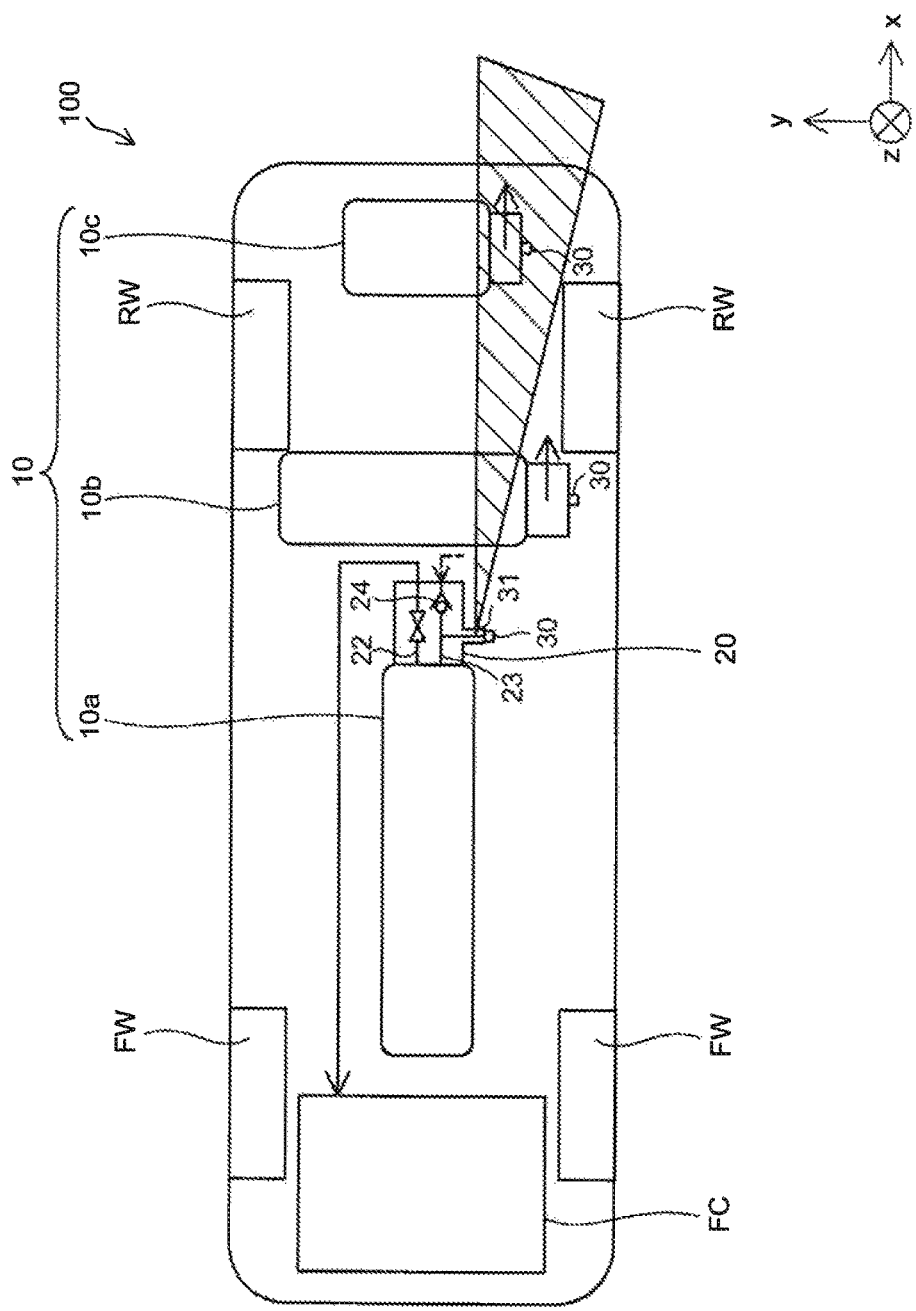
FIG. 1 is an explanatory view showing a schematic configuration of a vehicle.

A. First embodiment: FIG. 1 is an explanatory view showing a schematic configuration of a vehicle 100 in one embodiment of the present disclosure. The vehicle 100 includes front wheels FW, rear wheels RW, and a plurality of tanks 10a, 10b, 10c. The number of tanks to be installed may be set to be any number. In the present embodiment, the vehicle 100 is a fuel cell vehicle. The vehicle 100 includes a fuel cell stack FC as an electric power source, and a motor (not illustrated) as a power source is driven so as to drive at least either the front wheels (FW) or the rear wheels (RW). The fuel cell stack FC is a polymer electrolyte fuel cell, and generates electric power by receiving air supply and hydrogen-gas supply from the respective tanks 10a, 10b, 10c.

Of the plurality of tanks 10a, 10b, 10c arranged in the longitudinal direction (an x-axis direction) of the vehicle 100, the tank 10a disposed at a frontward position (a − x-axis direction) is referred to as a "front tank", the tank 10b and the tank 10c disposed at more rearward positions (a + x-axis direction) than the front tank are referred to as "rear tanks". In the present embodiment, the vehicle 100 includes a plurality of rear tanks. The front tank is arranged such that a longer-length direction thereof extends along the longitudinal direction (the x-axis direction) of the vehicle 100, and each rear tank is arranged such that a longer-length direction thereof extends along the lateral direction (a y-axis direction) of the vehicle. The tank 10c is disposed at a more rearward position of the vehicle 100 than the tank 10b.

In the present embodiment, the tank 10a, the tank 10b, and the tank 10c are referred to collectively as "tanks 10", hereinafter. Each tank 10 is a cylindrical-shaped container storing a hydrogen gas therein. The tank 10 has a cylindrical portion and two dome portions provided to both ends of the cylindrical portion, and an outer circumference of the tank is formed with a reinforcing layer made of carbon fibers impregnated with resin. Each tank 10 includes a tank valve 20, a pressure relief device 30, and a release part 31.

The tank valve 20 is a valve that carries out supply and discharge of a hydrogen gas to the tank 10. The tank valve 20 is provided at one end of the tank 10, more specifically, to an apex of one dome portion thereof. The tank valve 20 includes a supply flow passage 22 used for supplying the hydrogen gas to the fuel cell stack FC, and a charge flow passage 23 used for charging the tank 10 with the hydrogen gas.

The charge flow passage 23 is provided with a check valve 24 configured to prevent the hydrogen gas in the tank 10 from leaking out to the outside. The charge flow passage 23 is provided with the pressure relief device 30 between the tank 10 and the check valve 24.

The pressure relief device 30 is a valve mechanism configured to open if a temperature of the tank becomes a predetermined temperature or more. In the present embodiment, as the pressure relief device 30, a fusible-plug-type pressure relief device is provided. The pressure relief device 30 is configured to release the hydrogen gas in the tank 10 to the outside when the temperature of the tank 10 becomes a predetermined temperature or more because of fire or the like, to thereby prevent the tank 10 from having an excessively high inner pressure.

In the present embodiment, the tank 10a as the front tank is provided at a rear end (the + x-axis direction) of the tank with the release part 31 that releases the gas in the tank 10 in a predetermined direction. In the present embodiment, each of the tank 10b and the tank 10c as the rear tanks includes the pressure relief device 30 at a vehicle-leftward position (the − y-axis direction) of the tank. The pressure relief devices 30 of the rear tanks may be provided at vehicle-rightward positions (a + y-axis direction) of the tanks, and the respective pressure relief devices 30 of the tank 10b and the tank 10c may be provided in different directions from each other.

The release part 31 is a mechanism that regulates the release direction of the gas. As a mechanism to regulate the release direction of the gas, a hole, a pipe, or an air guiding plate that is provided to the tank valve 20 may be used, for example. A hatched part and arrows in FIG. 1 indicate the release directions of the gas released from the release parts 31 of the respective tanks 10. The release directions of the gas will be described later in detail.

Figure 2:
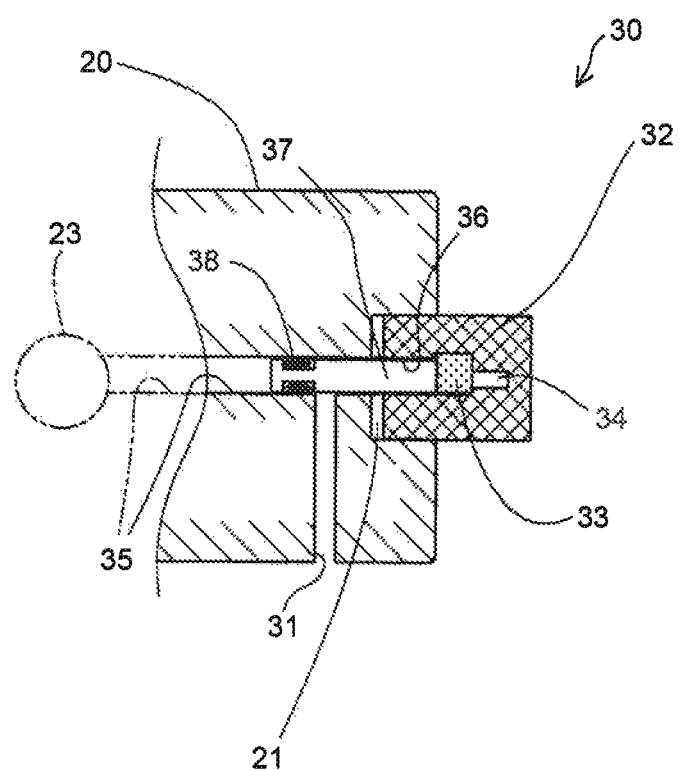
FIG. 2 is a cross-sectional view of a pressure relief device.

FIG. 2 is a cross-sectional view of the pressure relief device 30. As shown in FIG. 2, the pressure relief device 30 of the present embodiment includes a thermosensitive projection 32 fitted in a fitting hole 21 provided at one end of the tank valve 20, a valve body shaft 37, and an O-ring 38. The thermosensitive projection 32 projects from the tank valve 20.

The thermosensitive projection 32 houses a fusible plug member 33 thereinside, and is provided with a release hole 34 adjacent to the fusible plug member 33. The fusible plug member 33 is formed of an alloy to be melted when the pressure relief device 30 is exposed to a predetermined temperature higher than a supposed temperature under a normal gas-supply condition. In the present embodiment, as the fusible plug member 33, a binary alloy formed of bismuth (Bi) and indium (In) is used, for example. A composition of bismuth (Bi) and indium (In) is set such that the melting temperature, that is, the above predetermined temperature is approximately 110° C.

The tank valve 20 is provided with a gas-release passage 35. The gas-release passage 35 extends from the charge flow passage 23 in the tank valve 20 to a bottom portion of the fitting hole 21, and the release part 31 in a hole shape branches from the middle of the charge flow passage 23. The release part 31 communicates with the outside of the tank valve 20. The valve body shaft 37 is inserted into the gas-release passage 35 and a shaft guiding hole 36 provided to the thermosensitive projection 32, and when receiving a pressure of the gas in the tank 10 having flowed from the charge flow passage 23 into the gas-release passage 35, the valve body shaft 37 pushes the fusible plug member 33 against an inlet of the release hole 34.

A groove is formed around an outer circumference of the valve body shaft 37, and the O-ring 38 is disposed in this groove. The O-ring 38 seals the gas-release passage 35. The pressure relief device 30 having such a configuration maintains both the gas-release passage 35 extending from the charge flow passage 23 of the tank valve 20 to the outside of the tank and the release part 31 to be in a sealed state when the fusible plug member 33 is not melted.

When the fusible plug member 33 is melted, the molten fusible plug member 33 flows into the release hole 34. Hence, the valve body shaft 37 is pushed to move by the pressure of the gas in the tank until the fusible plug member 33 flows into the release hole 34. Through this, the pressure relief device 30 allows the release part 31 having been sealed until then by the O-ring 38 to communicate with the gas-release passage 35, shifts the gas-release passage 35 connected to the charge flow passage 23 to an open state via the release part 31, and releases the gas in the tank 10 through the gas-release passage 35 and the release part 31 to the atmosphere. In the present application, "opening" of the pressure relief device 30 denotes that the release part 31 and the gas-release passage 35 come into communication with each other by movement of the valve body shaft 37 due to melting of the fusible plug member 33. In FIG. 2, the release part 31 is illustrated to be directed downward; but actually, the release part 31 is directed to release the gas toward a direction as described with reference to FIG. 3.

Figure 3:
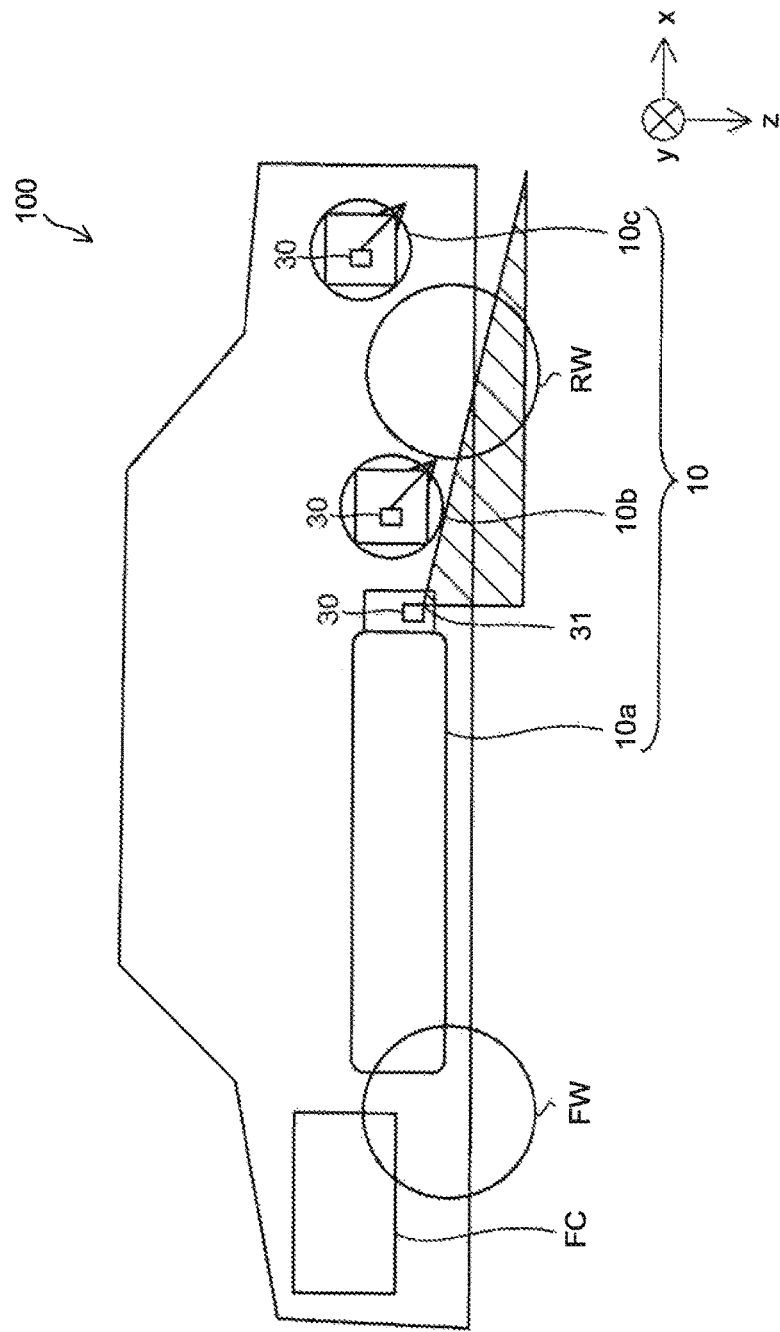
FIG. 3 is a side view of the vehicle at the time of releasing gas in tanks.

FIG. 3 is a side view of the vehicle 100 at the time of releasing the gas of the tanks 10. In the present embodiment, the tank 10b is disposed more downward than the tank 10c in the vertical direction (a z-axis direction). As indicated by the respective hatched parts in FIG. 1 and FIG. 3, in the present embodiment, the release direction of the gas released from the release part 31 of the tank 10a as the front tank by the opening of the pressure relief device 30 is defined to be a direction directly facing a space between the pressure relief device 30 of the tank 10c as the rear tank and the ground. This space is a space located obliquely rearward and downward of the tank 10a, and is a space except for a space where the tank 10b and the tank 10c that are the rear tanks and the rear wheels RW included in the vehicle 100 are disposed. More specifically, in the present embodiment, the release direction of the gas released from the release part 31 of the tank 10a is defined within a range from the vertically downward direction of the tank 10a to a tangential line relative to an outer diameter of the tank 10b. As indicated by arrows in FIG. 3, the release direction of the gas of each of the tank 10b and the tank 10c is defined in a rearward and downward direction of the vehicle 100.

According to the above-described vehicle 100 of the present embodiment, since the release direction of the gas from the release part 31 of the tank 10a as the front tank is located between the pressure relief device of the tank 10c as the rear tank and the ground, in the case in which a heat source is located at a frontward position of the vehicle 100, the pressure relief device 30 of the tank 10c as the rear tank can be heated by the gas released from the release part 31 of the tank 10a as the front tank. Hence, during operation of the pressure relief device 30 of the tank 10a as the front tank, it is possible to efficiently supply heat to the pressure relief device 30 of the tank 10c as the rear tank that is located farthest from the heat source; therefore, operation of the pressure relief device 30 of the tank 10c as the rear tank becomes easier. Accordingly, it is possible to rapidly operate the pressure relief device of the rear tank.

In addition, the longer-length direction of the tank 10a as the front tank extends along the longitudinal direction of the vehicle 100, and the release part 31 is provided at a rear end of the tank 10a; therefore, when the front part of the vehicle 100 is heated, it is possible to rapidly operate the pressure relief device 30 of the tank 10c as the rear tank.

Figure 4:
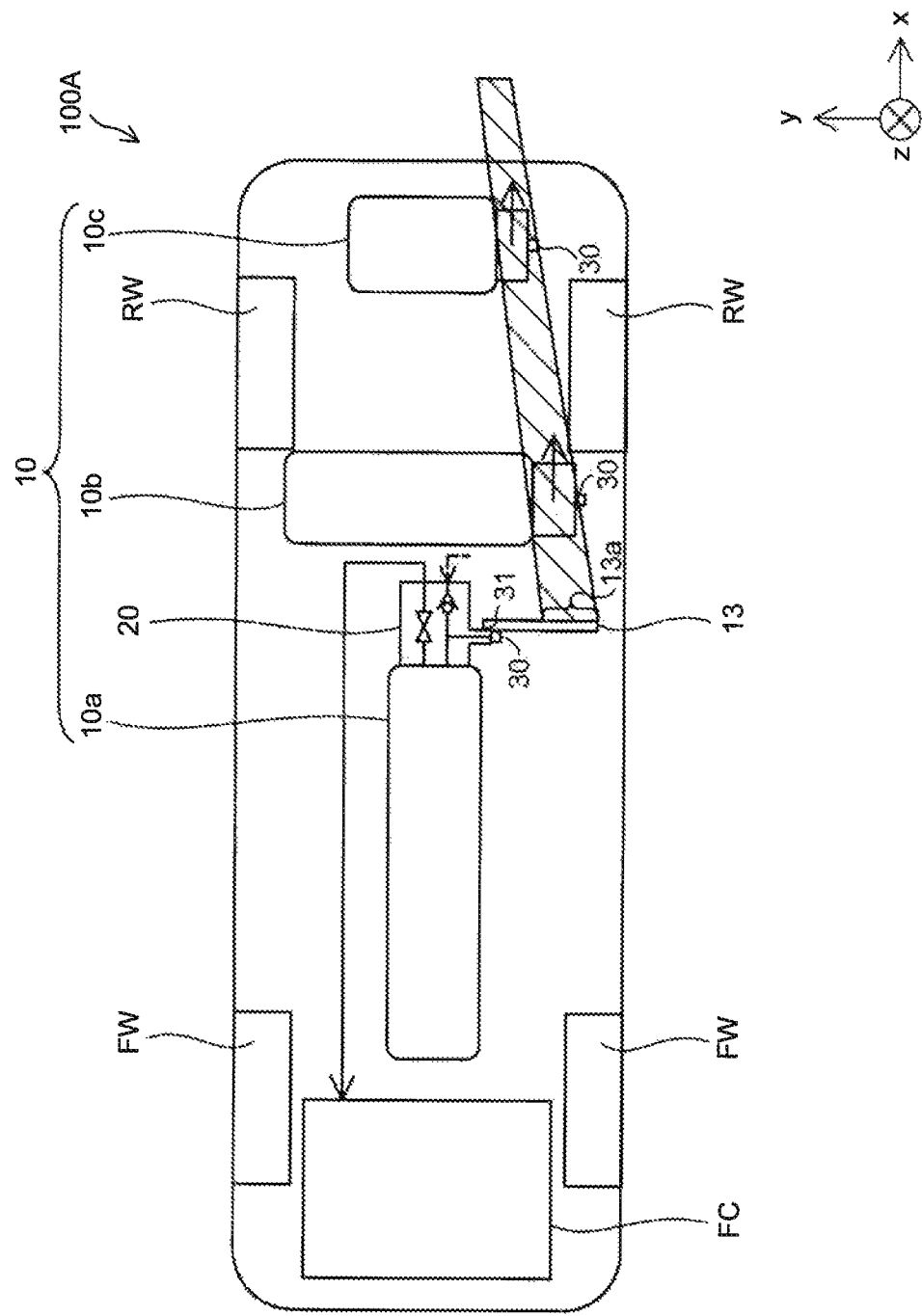
FIG. 4 is an explanatory view showing a schematic configuration of the vehicle in a second embodiment.

B. Second embodiment: FIG. 4 is an explanatory view showing a schematic configuration of a vehicle 100A in the second embodiment. In the present embodiment, the release part 31 of the tank 10a as the front tank is provided with a gas release pipe 13 in a pipe shape extending in a leftward direction (a − y-axis direction) of the vehicle 100A. As shown in FIG. 4, a gas release port 13a of the gas release pipe 13 is directed within a range defined by connecting the pressure relief device 30 of the tank 10b and the pressure relief device 30 of the tank 10c, as viewed from above the vehicle 100A.

Figure 5:
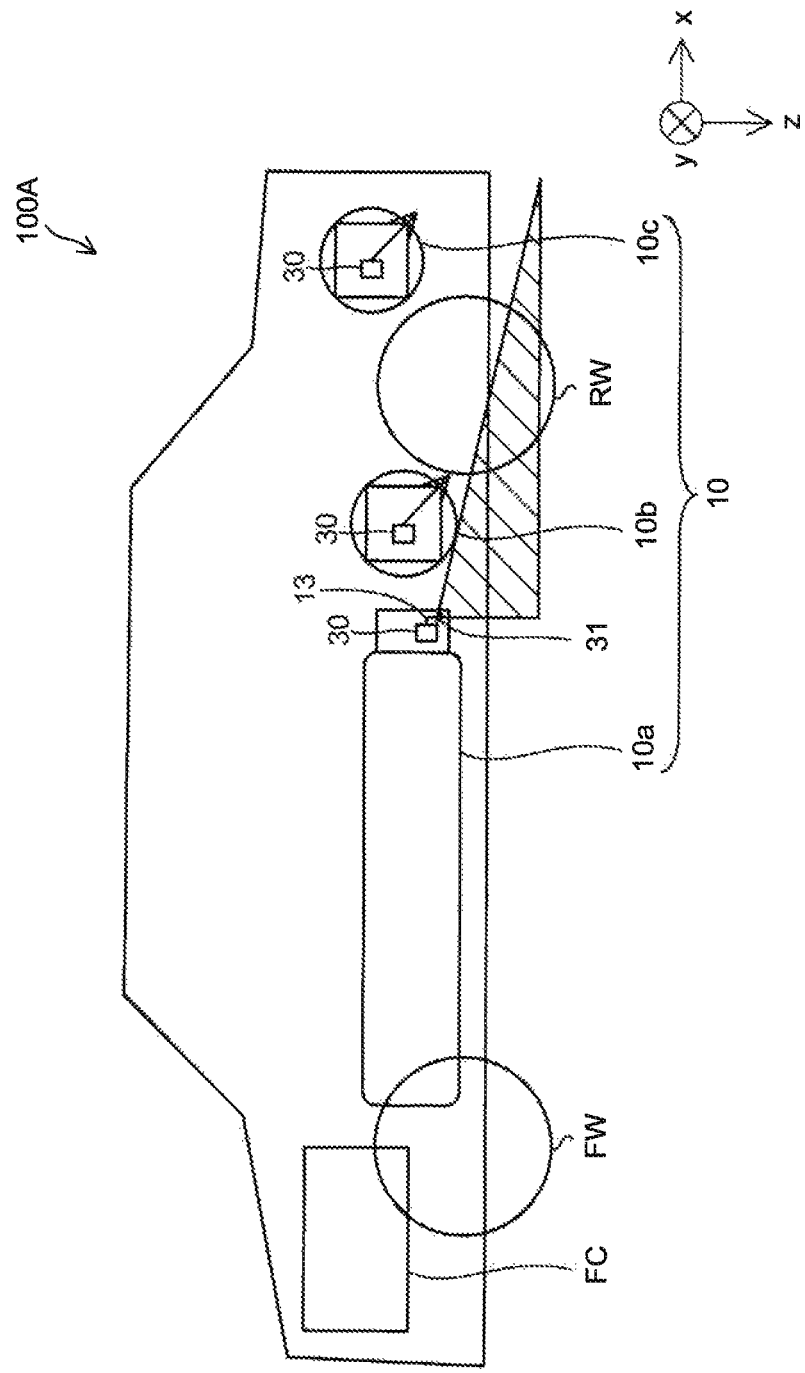
FIG. 5 is a side view of the vehicle at the time of releasing the gas in the tanks.

FIG. 5 is a side view of the vehicle 100 at the time of releasing the gas of the tanks 10. In the present embodiment, the tank 10b is disposed more downward than the tank 10c in the vertical direction (the z-axis direction). As indicated by respective hatched parts in FIG. 4 and FIG. 5, in the present embodiment, the release direction of the gas released from the release part 31 of the tank 10a as the front tank by the opening of the pressure relief device 30 is defined to be a direction directly facing a space between the pressure relief devices 30 of all the rear tanks (the tank 10b and the tank 10c) and the ground.

According to the above-described vehicle 100A of the present embodiment, since the release direction of the gas from the gas release port 13a of the tank 10a as the front tank is located between the pressure relief devices 30 of all the rear tanks (the tank 10b and the tank 10c) and the ground, in the case in which the heat source is located at a frontward position of the vehicle 100A, the pressure relief devices 30 of all the rear tanks can be heated by the gas released from the gas release port 13a of the tank 10a as the front tank. Hence, during operation of the pressure relief device 30 of the tank 10a as the front tank, it is possible to efficiently supply heat to the pressure relief devices 30 of all the rear tanks located farther from the heat source; therefore, operations of the pressure relief devices 30 of all the rear tanks become easier. Accordingly, it is possible to rapidly operate the pressure relief devices of the rear tanks.

The gas release pipe 13 defining the release direction is provided to only the tank 10a as the front tank, and thus it is possible to reduce manufacturing cost of the vehicle 100A.

Figure 6:
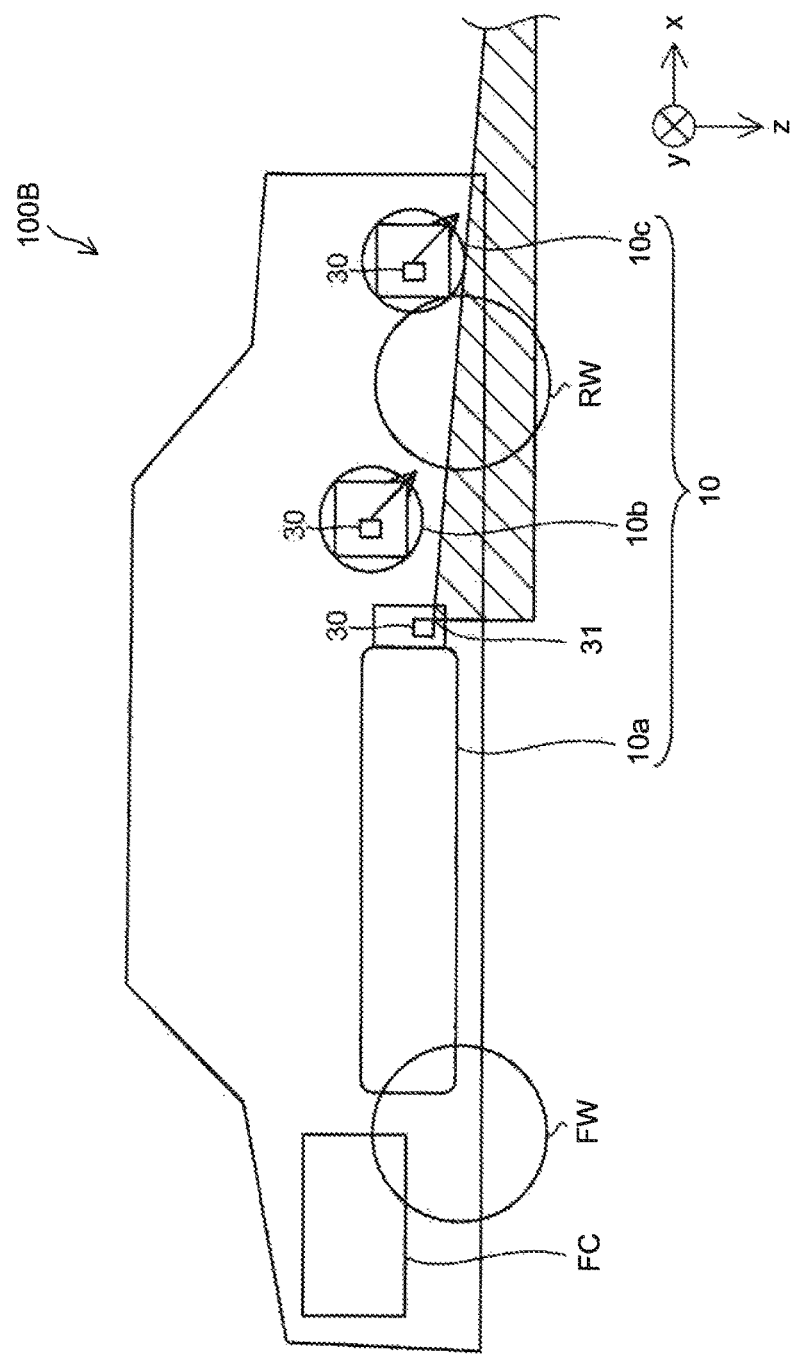
FIG. 6 is a side view of the vehicle at the time of releasing the gas in the tanks in a first variation.

C. Variations: <First variation> FIG. 6 is a side view of the vehicle 100B at the time of releasing the gas of the tanks 10 in the first variation. In the above embodiments, the tank 10b is disposed more downward than the tank 10c in the vertical direction (the z-axis direction). To the contrary, the tank 10c may be disposed more downward than the tank 10b in the vertical direction (the z-axis direction). In the present variation, as indicated by a hatched part in FIG. 6, the release direction of the gas released from the release part 31 of the tank 10a is defined to be within a range from the vertically downward direction of the tank 10a to a tangential line relative to the outer diameter of the tank 10c. The tank 10b and the tank 10c may be arranged at the same height in the vertical direction (the z-axis direction).

<Second variation> In the above embodiments, the vehicle 100 includes the tank 10b and the tank 10c as the two rear tanks. To the contrary, the vehicle 100 may include only one rear tank. In the above embodiments, the tank 10a as the front tank is arranged such that the longer-length direction thereof extends along the longitudinal direction of the vehicle 100. To the contrary, as with the tank 10b and the tank 10c, the tank 10a may be arranged along a lateral direction of the vehicle 100. Furthermore, the tank 10a may be arranged along the lateral direction of the vehicle 100, and the tank 10b and the tank 10c may be arranged along the longitudinal direction of the vehicle 100. The tank 10b and the tank 10c may be arranged in different directions from each other.

<Third variation> In the above embodiments, the structure of the pressure relief device 30 shown in FIG. 2 is one example, and any structure may be employed as the structure of the pressure relief device 30 as far as this structure allows the valve to open when the temperature of the tank of interest becomes the predetermined temperature or more.

<Fourth variation> In the above embodiments, each of the vehicle 100 and the vehicle 100A is a fuel cell vehicle, and a hydrogen gas as a fuel gas is stored in the tanks 10, but the present disclosure is not limited to this. For example, each of the vehicle 100 and the vehicle 100A may be an LPG vehicle using a liquefied petroleum gas as a fuel. In this case, an LP gas as the fuel gas is stored in the tanks 10.

The present disclosure is not limited to the above-described embodiments and variations but may be implemented by various other configurations without departing from the scope of the disclosure. For example, the technical features of the embodiments and variations corresponding to the technical features of the respective aspects described in Summary may be replaced or combined appropriately, in order to solve the problems described above or in order to achieve some or all of the advantageous effects described above. In addition, any of the technical features may be omitted appropriately unless the technical feature is described as essential herein.

What is claimed is:

1. A vehicle comprising
    a plurality of tanks storing gas in the tanks and arranged in a longitudinal direction of the vehicle, the tanks including a front tank located at a frontward position among the plurality of tanks and a plurality of rear tanks located at more rearward positions than the front tank, wherein
    each of the tanks includes a pressure relief device configured to open when a temperature of the tank becomes a predetermined temperature or more; and a release part releasing the gas in the tank in a predetermined direction by the opening of the pressure relief device,
    a release direction of the gas released from the release part of the front tank is defined to be a direction directly facing a space between the pressure relief devices of all the rear tanks and a ground,
    the rear tanks include downward tanks located such that at least a part of an outer diameter of each of the downward tanks is closer to the ground than the release part of the front tank, and
    the release direction of the gas released from the release part of the front tank is inclined more downward than the most downwardly inclined tangential line among tangential lines that connect the pressure release device of the front tank with corresponding outer diameters of the downward rear tanks.

2. The vehicle according to claim 1, wherein
    the front tank is arranged such that a longer-length direction of the front tank extends along the longitudinal direction of the vehicle,
    the release part of the front tank is disposed at a rear end of the front tank, and
    a first tank of the rear tanks is arranged such that a longer-length direction of the first tank extends along a lateral direction of the vehicle.

3. The vehicle according to claim 1, wherein
    the release directions of the gas of the rear tanks are defined to face a rearward and downward direction of the vehicle.

4. The vehicle according to claim 1, wherein
    the rear tanks include a first rear tank and a second rear tank,
    the second rear tank is disposed at a more rearward position of the vehicle than the first rear tank, and
    the first rear tank is disposed more downward than the second rear tank in a vertical direction.

5. The vehicle according to claim 4, wherein
    the release direction of the gas released from the release part of the front tank is defined within a range from a vertically downward direction of the front tank to a tangential line relative to an outer diameter of the first rear tank.

6. The vehicle according to claim 1, wherein
    the rear tanks include a first rear tank and a second rear tank,
    the second rear tank is disposed at a more rearward position of the vehicle than the first rear tank, and
    the second rear tank is disposed more downward than the first rear tank in a vertical direction.

7. The vehicle according to claim 6, wherein
    the release direction of the gas released from the release part of the front tank is defined within a range from a vertically downward direction of the front tank to a tangential line relative to an outer diameter of the second rear tank.

8. The vehicle according to claim 1, wherein
    the vehicle is a fuel cell vehicle, and a hydrogen gas as a fuel gas is stored in the tanks.

* * * * *